March 11, 1958 J. SAMUEL 2,826,690
THYRATRON CONTROLLED BY TRIGGERED PULSE PRODUCER WITH INACTIVE-TIME-LAPSE DESENSITIZING OF TRIGGERING
Filed May 8, 1957
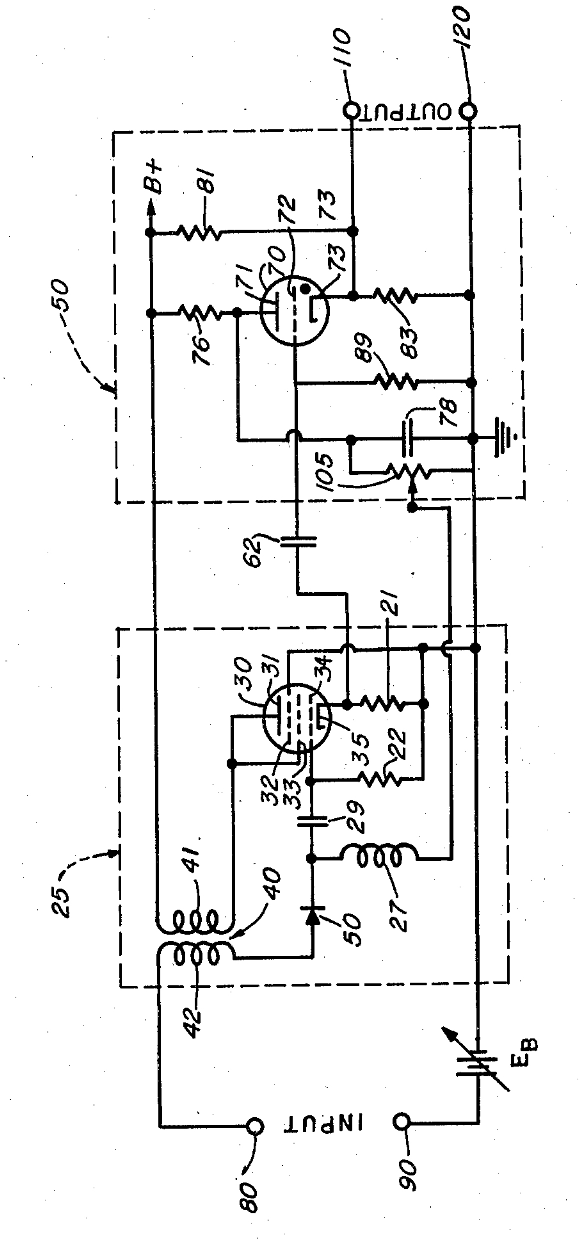
INVENTOR.
James Samuel
BY
W. E. Thibodeau, T. J. Lynch, F. E. McGee & J. F. Edgerton United States Patent Office 2,826,690 Patented Mar. 11, 1958

2,826,690

THYRATRON CONTROLLED BY TRIGGERED PULSE PRODUCER WITH INACTIVE-TIME-LAPSE DESENSITIZING OF TRIGGERING

James Samuel, Washington, D. C., assignor to the United States of America as represented by the Secretary of the Army Application May 8, 1957, Serial No. 657,989

6 Claims. (Cl. 250—27)

(Granted under Title 35, U. S. Code (1952), sec. 266)

The invention described herein may be manufactured and used by or for the Government for governmental purposes without the payment to me of any royalty thereon.

This invention relates to an electronic decision circuit responsive to a predetermined pattern of input voltage.

There are many applications which require that a circuit respond only to a particular pattern of input voltage. For example, it may be required that the circuit recognize when the input voltage has reached a certain value after having attained some other level for a predetermined period of time. A desirable circuit to receive such an input voltage pattern is one which will produce an output pulse when this particular voltage pattern is applied and strongly reject any other applied pattern.

An object of this invention is to provide a stable, sensitive decision circuit which responds only to a particular pattern of input voltage.

Another object of this invention is to provide a stable, sensitive decision circuit which produces an output pulse only when the input voltage has reached a predetermined value after previously having attained some other predetermined value.

A further object of this invention is to provide a stable, sensitive decision circuit which produces an output pulse only when the input voltage has reached a predetermined value after previously having been below another predetermined value for a predetermined period of time.

Still another object of this invention is to provide a stable, sensitive decision circuit which produced an output pulse only when the input voltage has reached a predetermined positive value after having been more negative than a predetermined negative value for a predetermined period of time.

A typical embodiment of a decision circuit in accordance with the invention comprises a blocking oscillator, a self-restoring thyratron circuit having a thyratron electron tube, the thyratron grid being connected to the blocking oscillator so that the thyratron conducts for each blocking oscillator pulse, and a forward biased diode connected in series with the input voltage in the feedback loop to the grid of the blocking oscillator tube, the bias on the diode determining whether the blocking oscillator is "on" or "off." The thyratron circuit is used to change the bias on the diode when the input voltage overcomes the forward bias and turns "off" the blocking oscillator. The input voltage must now reach a different value before the blocking oscillator turns "on" again. When the input voltage does turn the blocking oscillator "on" again, the thyratron fires on the first pulse from the blocking oscillator, this first pulse being used as the output pulse of the decision circuit. This decision circuit therefore produces an output pulse only after two values of input voltage are attained in a particular sequence. Other decision circuits within the scope of the invention can be adapted in a similar manner to respond only to a desired pattern of input voltage.

The specific nature of the invention, as well as other objects, uses, and advantages thereof, will clearly appear from the following description and from the accompanying drawing, in which:

The drawing shows a decision circuit in accordance with the invention. This decision circuit produces an effective output pulse having a usable value only when the input voltage reaches a predetermined positive value after having been below a predetermined negative value for at least a predetermined time.

In the drawing, a diode-triggered blocking oscillator 25 comprises a pentode 30 having plate 31, suppressor grid 32, screen grid 33, control grid 34 and cathode 35 elements. The suppressor grid 32 is grounded and the plate 31 is connected to the screen grid 33. A two-winding transformer 40 has a first winding 41 and a second winding 42. A series circuit that includes winding 42 and a diode 50 is connected across input terminals 80 and 90. The first winding 41 of the transformer 40 is connected between B+ and the plate 31. A resistor 22 serves as a D.-C. grid return and a capacitor 29 prevents the bias voltage on the diode 50 from appearing on the grid. A controllable forward bias voltage is placed on the diode 50 by means of a voltage source $E_B$ connected between input terminal 90 and circuit ground.

Positive blocking oscillator output pulses are obtained across a cathode resistor 21 connected between the cathode 35 and circuit ground. These output pulses are applied through a coupling capacitor 62 to the grid 72 of a thyratron electron tube 70 in a thyratron circuit 50. Circuit 50 is self-restoring; the thyratron, which would ordinarily remain conducting after having a firing pulse applied to its grid, is made to automatically stop conducting and return to its non-conducting state after the end of the firing pulse. Such a thyratron can be made to conduct for each of a succession of firing pulses applied to its grid if the time between the firing pulses is sufficient to allow the thyratron to be returned to its non-conducting state.

The thyratron 70 of the thyratron circuit 50 has plate 71, control grid 72 and cathode 73 elements, and is made self-restoring by means of a resistor 76—having a value too large to permit the thyratron 70 to conduct—connected between B+ and the plate 71, and by means of a capacitor 78 connected between the plate 71 and circuit ground, the capacitor 78 discharging through the thyratron 70 when a firing pulse is applied to the grid 72. The thyratron 70 stops conducting and becomes non-conducting when the voltage across the capacitor 78 discharges to a value which is below the conduction value of the thyratron. In the absence of an input signal to the thyratron grid 72, a resistor 81 connected between B+ and the cathode 73 and a resistor 83 connected between the cathode 73 and circuit ground provide negative bias for the thyratron 70. The resistor 83 also serves as an output resistor, output terminals 110 and 120 being connected across it. A resistor 89 serves as a grid resistor. A potentiometer 105 having its ends connected across the capacitor 78 applies a portion of the voltage across the capacitor 78 in series with the diode 50 by having its variable arm connected to the cathode of the diode 50 through an inductor 27, the inductor 27 maintaining a high impedance in the grid circuit of the blocking oscillator.

At zero input voltage, the bias voltage $E_B$ applies a forward bias to the diode 50 causing the blocking oscillator 50 to oscillate and apply the positive blocking oscillator pulses across the resistor 21 to the thyratron grid 72 through the coupling capacitor 62, the thyratron 70 thereupon conducting for each pulse of the blocking oscillator. The oscillation frequency of the blocking oscillator 50 and the values of the resistor 76, the potentiometer 105 and the capacitor 78 are chosen so that the voltage across the capacitor 78 remains at a low value during the time the blocking oscillator 50 is oscillating. A working value of the period of the blocking oscillator is one-tenth of the time constant of the charging circuit of the capacitor 78. The portion of the voltage across the capacitor 78 which is inserted in series with the diode 50 and the input terminals 80 and 90 is thus small and can be made negligible when compared to $E_B$.

The value of $E_B$ therefore constitutes a negative threshold value. When the input voltage becomes sufficiently negative to overcome the forward bias on the diode 50 supplied by $E_B$ the diode 50 opens, oscillations cease and the thyratron 70 becomes non-conducting, whereupon the voltage across the capacitor 78 rises from the low value at which the intermittent conduction of the thyratron 70 had held it towards a value determined by the B+ voltage and the values of the resistor 76 and the potentiometer 105, the values of B+, the resistor 76 and potentiometer 105 being chosen so that the voltage across the capacitor 78 rises to a voltage considerably greater than the low value at which it was held by oscillation of the blocking oscillator. The rise in voltage on the capacitor 78 causes the potentiometer 105 to apply a reverse bias voltage to the diode 50 preventing the revival of blocking oscillator oscillations until the sum of the input voltage and $E_B$ overcomes this reverse bias voltage. The position of the variable arm of the potentiometer 105 thus determines the positive threshold value. Upon the revival of blocking oscillator oscillations, the first blocking oscillator oscillation pulse causes the capacitor 78, which has charged up to a value which is considerably greater than before, to discharge through the thyratron 70 producing an output pulse of large magnitude at the output terminals 110 and 120 connected across the resistor 83.

By making use of the time required for the capacitor 78 to charge up from its initial low value when the blocking oscillator is oscillating to its considerably greater value when the thyratron 70 becomes non-conducting, it is possible to prevent a usable pulse from appearing at the output terminals 110 and 120 unless the input voltage remains for a predetermined time at a value which keeps the blocking oscillator oscillations from being revived. The values of the resistor 76, the potentiometer 105 and the capacitor 78 can be chosen so that the voltage across the capacitor is sufficiently small to prevent a usable output pulse from appearing at the output terminals 110 and 120 until the thyratron 70 has remained non-conducting for this predetermined time.

The decision circuit shown in the drawing therefore will respond to a pattern of input voltage where the input voltage reaches a predetermined positive value after having been below a predetermined negative value for at least a predetermined time. The positive and negative threshold values can easily be set to plus or minus 0.25 volts so that high sensitivity is possible. In fact, by using for the diode 50, a 1N54 semiconductor diode, positive and negative threshold values can be set as low as 0.10 volt. Besides providing a high input sensitivity, this decision circuit has the further advantage of providing an output voltage having a substantial voltage value.

Many other types of decision circuits may be devised within the scope of the invention. Where the input voltage varies slowly the values of the resistor 76, the potentiometer 105 and the capacitor 78 can be made arbitrarily long. For rapidly changing input voltages these values can be shortened accordingly.

It will be apparent that the embodiment shown is only exemplary and that various modifications can be made in construction and arrangement within the scope of the invention as defined in the appended claims.

I claim:

1. An electronic decision circuit responsive to a predetermined pattern of input voltage, said circuit comprising in combination: a blocking oscillator, means for causing said blocking oscillator to oscillate at zero input voltage and cease to oscillate below a first predetermined input voltage, a thyratron circuit having a thyratron electron tube connected to be self-restoring, the oscillations of said blocking oscillator being applied to said thyratron to cause said thyratron to conduct intermittently, the cessation of the oscillations of said blocking oscillator causing said thyratron to remain non-conducting, means for utilizing the non-conducting state of said thyratron to prevent said blocking oscillator from operating until said input voltage reaches a second predetermined value, and means for utilizing, as an output signal, the change of said thyratron from a non-conducting state to an intermittently conducting state occurring when said blocking oscillator oscillations are revived.

2. The invention in accordance with claim 1, there being additionally provided, means for preventing an output signal from being produced until said thyratron remains in a non-conducting state for a predetermined time.

3. An electronic decision circuit responsive to a predetermined pattern of input voltage, said circuit comprising in combination: a blocking oscillator having an electron tube and a transformer, the windings of said transformer being connected to produce blocking oscillator action, a diode connected in series with the feedback loop to the grid of said tube, said diode being connected so that it acts as a low impedance during the conduction cycle of said blocking oscillator, means for applying a first bias voltage to said diode such that said blocking oscillator oscillates at zero input voltage and ceases to operate when said input voltage is below a first predetermined value determined by the value of said first voltage bias, said diode acting as a high impedance in said grid circuit when said input voltage is below said predetermined value, a thyratron circuit having an electron tube with its grid connected to receive positive oscillation pulses from said blocking oscillator and its plate and cathode connected so that said thyratron is self-restoring, the cessation of the oscillations of said blocking oscillator causing said thyratron to change from an intermittently conducting state to a non-conducting state, means for utilizing the non-conducting state of said thyratron to change said first bias voltage applied to said diode to a second bias voltage, said second bias voltage preventing said blocking oscillator from oscillating until said input voltage rises above a second predetermined value determined by said second bias voltage, and means for utilizing as an output voltage the change of said thyratron from a non-conducting state to an intermittently conducting state occuring when said blocking oscillations are revived.

4. The invention in accordance with claim 3, there being additionally provided, means for preventing an output signal from being produced until said thyratron remains in a non-conducting state for a predetermined time.

5. An electronic decision circuit responsive to a predetermined pattern of input voltage, said circuit comprising in combination: a blocking oscillator having an electron tube and a transformer, a first winding of said transformer being connected in the plate circuit of said electron tube and a second winding of said transformer being connected in the grid circuit of said electron tube, said first and second windings being connected to produce blocking oscillator action, a diode connected in series with said second transformer winding and said input voltage, said diode being connected to act as a low impedance during the conduction cycle of said blocking oscillator, means for applying a positive forward bias voltage to said diode, said positive forward bias voltage causing said blocking oscillator to oscillate at zero input voltage and cease to oscillate when said input voltage is more negative than said positive forward bias, a thyratron electron tube having at least plate, grid and cathode elements, a parallel capacitor and a first resistor connected across said plate and cathode of said thyratron, a second resistor having one end connected to a positive voltage source and the other end connected to the plate of said thyratron, said second resistor having a value which is too large to maintain conduction of said thyratron, means for applying a negative bias voltage to said thyratron to prevent conduction in the absence of an input signal, means for connecting said thyratron grid to said blocking oscillator so that said thyratron grid receives positive oscillation pulses, the oscillation frequency of said blocking oscillator and the values of said first and second resistors and said capacitor being chosen so that the voltage across said capacitor remains below a predetermined value during the time said blocking oscillator is oscillating, the cessation of said blocking oscillator oscillations causing said thyratron to become non-conducting, whereupon said capacitor voltage rises above said predetermined value towards said positive voltage source, means for applying a portion of said capacitor voltage in series with said diode with a polarity opposite to the polarity of said positive forward bias, said portion of capacitor voltage preventing the revival of said blocking oscillator oscillations until the sum of said input voltage and said positive forward bias voltage overcomes said portion of capacitor voltage applied in series with said diode, and a third resistor connected in series with said thyratron cathode, an output voltage pulse of said decision circuit being obtained across said third resistor when said blocking oscillator oscillations are revived, the first oscillation pulse causing said capacitor to discharge through said thyratron and said third resistor.

6. The invention in accordance with claim 5 wherein said first and second resistors and said capacitor are chosen so that the value of the voltage across said capacitor is below said predetermined value unless said thyratron has remained in a non-conducting state for a predetermined time.

References Cited in the file of this patent

UNITED STATES PATENTS

| | | |
|---|---|---|
| 2,578,273 | Wachtell | Dec. 11, 1951 |
| 2,777,092 | Mandelkorn | Jan. 8, 1957 |